Aug. 9, 1932.  K. VON KANDO  1,871,286

OIL SEAL FOR DYNAMO ELECTRIC MACHINES

Filed July 30, 1930

INVENTOR
Kalman von Kando.
BY
ATTORNEY

Patented Aug. 9, 1932

1,871,286

UNITED STATES PATENT OFFICE

KALMAN VON KANDO, OF BUDAPEST, HUNGARY, ASSIGNOR TO WESTINGHOUSE ELECTRIC & MANUFACTURING COMPANY, A CORPORATION OF PENNSYLVANIA

OIL SEAL FOR DYNAMO-ELECTRIC MACHINES

Application filed July 30, 1930, Serial No. 471,624, and in Hungary and Germany March 15, 1930.

My invention relates to oil seals for dynamo-electric machines and particularly to such seals as have means to compensate for the unequal expansion of the metal frame of the machine and the oil sealing member.

Prior to my invention, a micarta or like cylinder was frequently employed to separate the rotor of a dynamo-electric machine from an oil-filled stator of such machine. An oil-tight seal was maintained between the frame of the machine and the cylindrical sealing member by means of stuffing boxes at the ends of the cylinder. However, the coefficient of expansion of the metal frame and that of the oil-retaining cylinder were of such character that it was necessary for the cylinder to slip quite freely in the stuffing boxes. This slipping loosened the stuffing boxes and permitted oil leakage, with consequent serious damage to the machine.

It is an object of my invention to provide an improved seal between the oil-retaining cylinder and the frame of the machine.

It is a further object of my invention to provide a flexible oil-tight joint for such machine.

Figure 1:
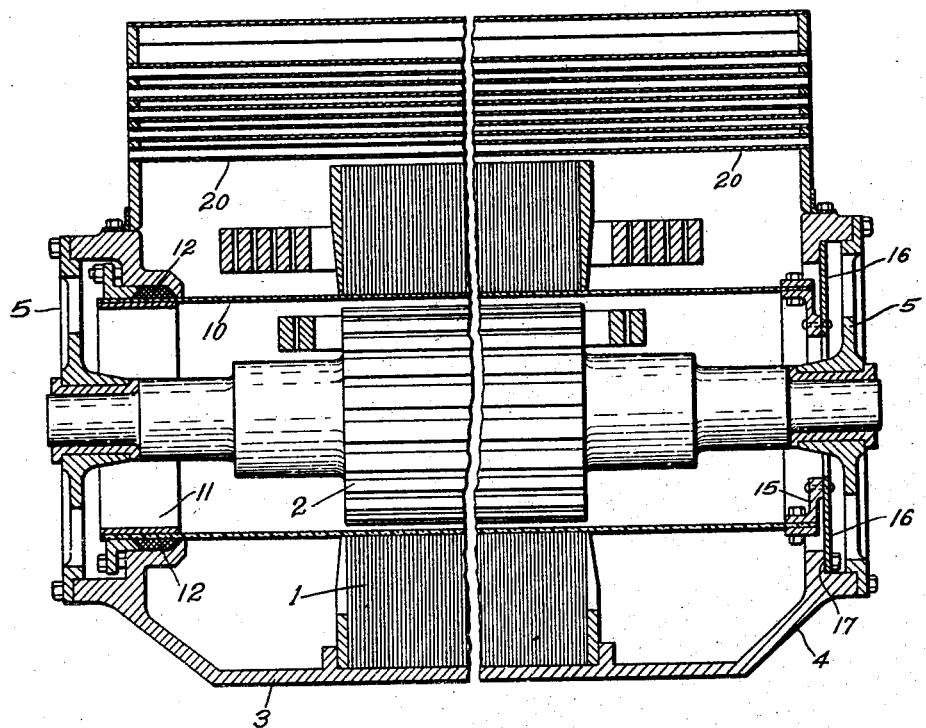

Other objects and advantages of my invention will be apparent from the following detailed description, taken in conjunction with the accompanying drawing, in which Figure 1 is a sectional elevation of a dynamo-electric machine comprising my invention.

Figure 2:
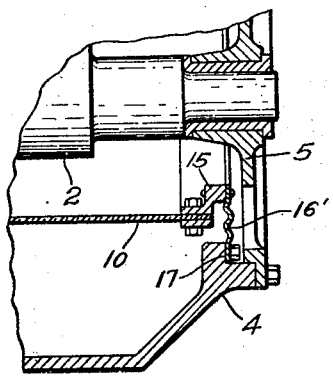

Fig. 2 is a fragmentary detail view showing a modification of my diaphragm.

The apparatus disclosed in the drawing comprises a dynamo-electric machine having a stator 1 and a rotor 2, extending therethrough. The stator is enclosed in a frame 3, to which are secured end bells 5 for supporting the rotor. Lying in the space between the rotor and the stator is an oil-retaining cylinder 10, preferably of micarta or other non-magnetic high-resistance material. At one end of the oil-retaining cylinder is a reenforcing band 11, preferably of metal, having an inner diameter of such size that the rotor 2 may be passed through it. Surrounding the cylinder 10 and the reenforcing band 11, the frame of the machine is provided with a stuffing box 12 to form an oil-tight seal. The opposite end of the cylinder 10 is provided with an annular inwardly extending channel-shaped member 15 secured in oil-tight relation thereto. An annular metal diaphragm 16 is secured to the inner edge of the member 15 and extends between that member and an annular seat 17 on the machine frame. The diaphragm 16, is sufficiently flexible to take up any motion resulting from the different rate of expansion of the oil-retaining cylinder and the metal frame of the machine. The diaphragm 16 may be made oil tight by any suitable means, such as a rubber gasket or a packing ring.

In the modification shown in Fig. 2, the annular diaphragm 16′ is corrugated to increase it flexibility and to make possible a decrease in its thickness.

In operation, the frame of the machine will be filled with a cooling oil, which will be excluded from the rotor space by the cylindrical oil-retaining member and, preferably, the upper portion of the frame will be provided with tubes 20 or other means to cool the oil in the frame of the machine.

I do not desire to restrict myself to the specific embodiment of my invention herein shown and described, since it is evident that it may be changed and modified without departing from the spirit and scope of my invention as defined in the appended claims.

I claim as my invention:

1. A dynamo-electric machine comprising a stator, a rotor mounted within said stator, a fluid-tight frame about said stator, said frame being adapted to contain a cooling liquid, a sleeve extending through said stator and surrounding said rotor, a reenforcing collar in said sleeve near one end thereof, said collar having an opening of sufficient size to permit passage of said rotor therethrough, a fluid-tight packed joint between said reenforced sleeve and said casing, an annular flange secured to the opposite end of said sleeve, an annular, flexible diaphragm secured to said flange and to said casing, a cooling liquid occupying the space between said casing and said sleeve and means in said casing to cool said cooling liquid.

2. A dynamo-electric machine comprising a stator, a rotor mounted therein, a fluid-tight housing about the stator, a tubular member having a high electrical resistance and surrounding said rotor and separated therefrom, a reenforcing collar in one end of said member, a compressed packing between said casing and said member at a point opposite the reenforcing collar, an annular flange secured to the opposite end of said member and an annular diaphragm secured to said flange and to said casing.

3. A dynamo-electric machine comprising a stator, a rotor mounted therein, a fluid tight housing about the stator, a substantially tubular dielectric member between the rotor and the stator, a substantially rigid fluid tight joint between one end of the tubular member and the housing, an inwardly extending flange secured to the opposite end of the tubular member and a flexible diaphragm secured between the inner periphery of the flange and the casing.

4. A dynamo-electric machine comprising a rotor and a stator, a housing for said machine, a substantially non-magnetic casing separating the rotor from the stator, said casing being spaced from the rotor, one end of the casing being of sufficient size to permit insertion of the rotor into the casing, a substantially rigid fluid tight connection between the housing and the said end of the casing, an inwardly extending flange secured to the opposite end of the casing and a flexible fluid tight seal between the inner periphery of the flange and the casing.

In testimony whereof, I have hereunto subscribed my name this seventh day of July, 1930.

KALMAN von KANDO.